US012610334B2

(12) United States Patent
Guo et al.

(10) Patent No.: US 12,610,334 B2
(45) Date of Patent: Apr. 21, 2026

(54) CLOCK CALIBRATION METHOD, CLOCK CALIBRATION APPARATUS, ELECTRONIC DEVICE, AND READABLE MEDIUM

(71) Applicant: ZTE CORPORATION, Shenzhen (CN)

(72) Inventors: Yang Guo, Shenzhen (CN); Lu Zhao, Shenzhen (CN); Bo He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 446 days.

(21) Appl. No.: 18/033,331

(22) PCT Filed: Nov. 5, 2021

(86) PCT No.: PCT/CN2021/128868
§ 371 (c)(1),
(2) Date: Apr. 22, 2023

(87) PCT Pub. No.: WO2022/095947
PCT Pub. Date: May 12, 2022

(65) Prior Publication Data
US 2023/0397139 A1 Dec. 7, 2023

(30) Foreign Application Priority Data

Nov. 5, 2020 (CN) .......................... 202011225281.2

(51) Int. Cl.
*H04W 56/00* (2009.01)
(52) U.S. Cl.
CPC ............................... *H04W 56/0035* (2013.01)

(58) Field of Classification Search
CPC .... H02P 21/22; H02P 21/14; H04L 25/03885; H04L 25/03057
See application file for complete search history.

(56) References Cited

U.S. PATENT DOCUMENTS

2016/0128014 A1 5/2016 Xiaoding
2019/0207695 A1 7/2019 Aweya

FOREIGN PATENT DOCUMENTS

| CA | 2650256 A1 * | 11/2007 | ............ H04W 16/26 |
| CN | 106656386 A | 5/2017 | |
| CN | 108964819 A | 12/2018 | |
| CN | 110557823 A | 12/2019 | |
| CN | 111885696 A | 11/2020 | |
| CN | 113541913 A | 10/2021 | |
| WO | WO-2007136732 A2 * | 11/2007 | ............ H04W 16/26 |
| WO | WO 2019125350 A1 | 6/2019 | |

OTHER PUBLICATIONS

European Patent Office, the Extended European Search Report dated Oct. 17, 2024, for corresponding EP application No. 21888639.8.
WIPO, International Search Report issued on Jan. 27, 2022.

* cited by examiner

*Primary Examiner* — Phuoc H Doan
(74) *Attorney, Agent, or Firm* — Li & Cai Intellectual Property (USA) Office

(57) ABSTRACT
The present disclosure provides a clock calibration method. The clock calibration method includes: calculating a clock skew of a terminal device, and calibrating a clock of the terminal device according to the clock skew. The present disclosure further provides a clock calibration apparatus, an electronic device, and a computer-readable medium.

11 Claims, 4 Drawing Sheets a clock skew of a terminal device is calculated ⟩ S1 a clock of the terminal device is calibrated according to the clock skew ⟩ S2

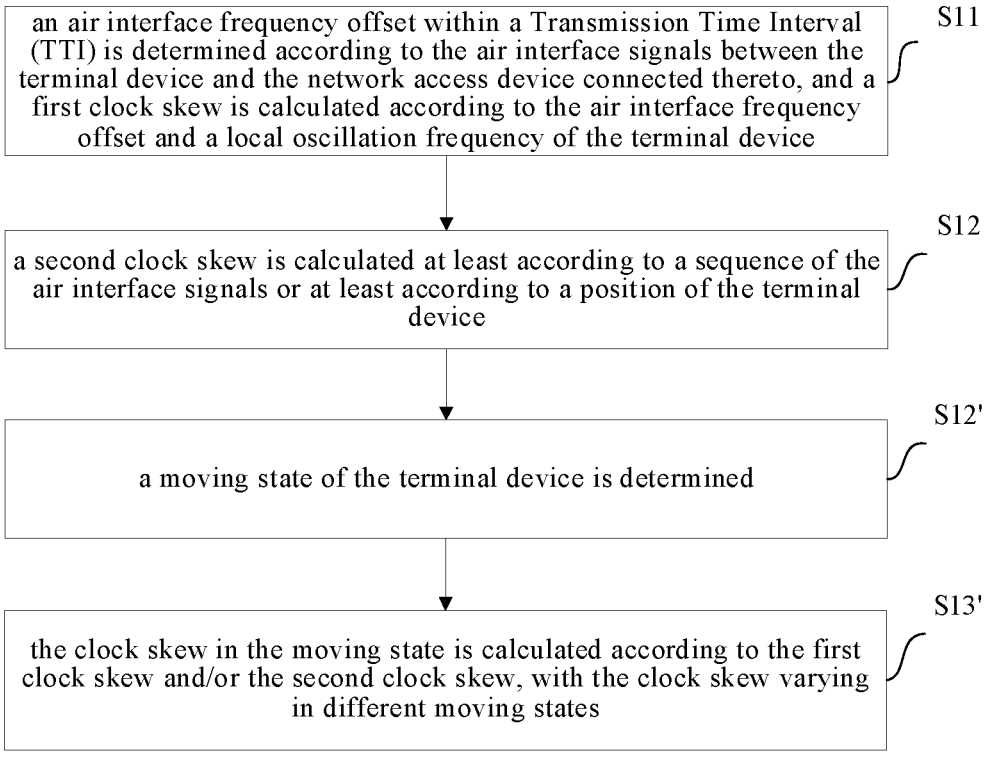

an air interface frequency offset within a Transmission Time Interval (TTI) is determined according to the air interface signals between the terminal device and the network access device connected thereto, and a first clock skew is calculated according to the air interface frequency offset and a local oscillation frequency of the terminal device — S11 a second clock skew is calculated at least according to a sequence of the air interface signals or at least according to a position of the terminal device — S12 a moving state of the terminal device is determined — S12' the clock skew in the moving state is calculated according to the first clock skew and/or the second clock skew, with the clock skew varying in different moving states — S13'

FIG. 4

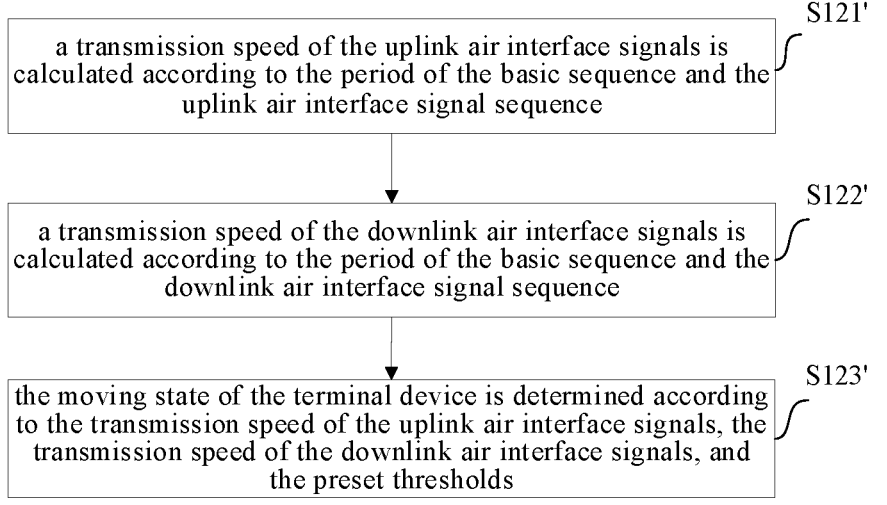

a transmission speed of the uplink air interface signals is calculated according to the period of the basic sequence and the uplink air interface signal sequence — S121' a transmission speed of the downlink air interface signals is calculated according to the period of the basic sequence and the downlink air interface signal sequence — S122' the moving state of the terminal device is determined according to the transmission speed of the uplink air interface signals, the transmission speed of the downlink air interface signals, and the preset thresholds — S123'

FIG. 5

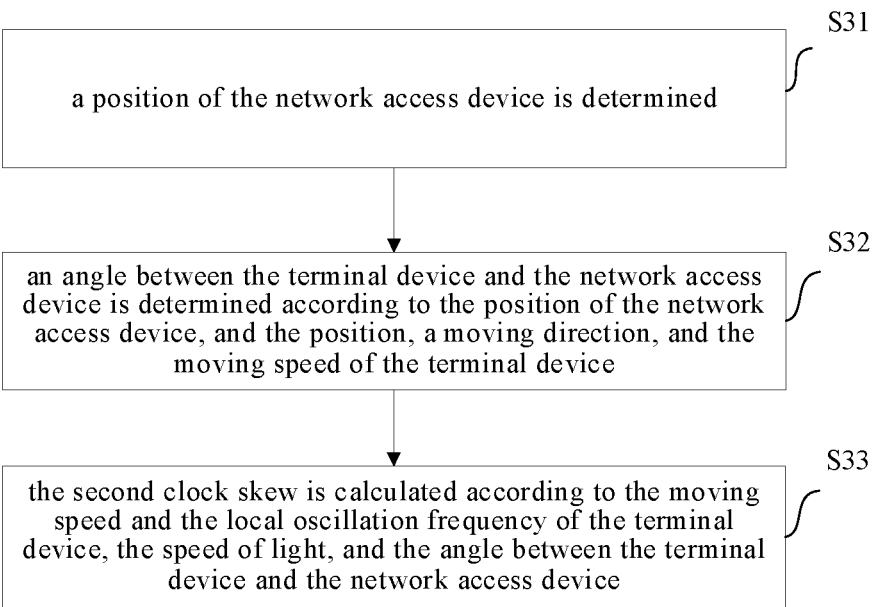

S31
a position of the network access device is determined

S32
an angle between the terminal device and the network access device is determined according to the position of the network access device, and the position, a moving direction, and the moving speed of the terminal device S33
the second clock skew is calculated according to the moving speed and the local oscillation frequency of the terminal device, the speed of light, and the angle between the terminal device and the network access device

FIG. 6

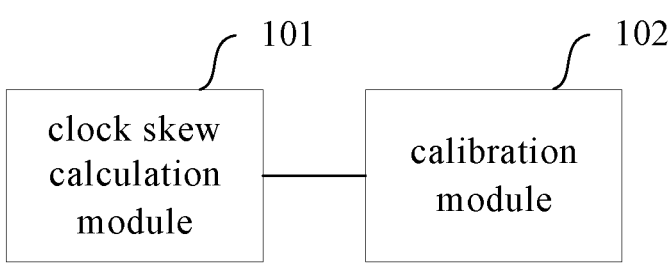

101
clock skew calculation module 102
calibration module

FIG. 7

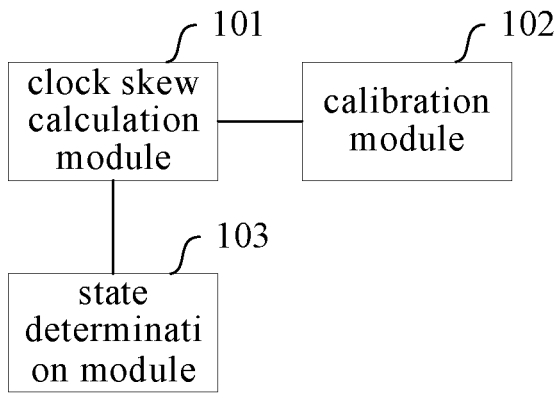

101
clock skew calculation module 102
calibration module 103
state determination module

FIG. 8

CLOCK CALIBRATION METHOD, CLOCK CALIBRATION APPARATUS, ELECTRONIC DEVICE, AND READABLE MEDIUM

CROSS-REFERENCE TO RELATED APPLICATIONS

The present disclosure is a National Phase Application filed under 35 U.S.C. 371 as a national stage of PCT/CN2021/128868, filed on Nov. 5, 2021, an application claiming the priority to the Chinese Patent Application No. 202011225281.2 filed with the CNIPA on Nov. 5, 2020, the entire contents of which are incorporated herein by reference.

TECHNICAL FIELD

The present disclosure relates to, but is not limited to, the technical field of communications.

BACKGROUND

Devices in a wireless system need to be subjected to clock synchronization to ensure transmission and reception of signals of all the devices in the wireless system. Thus, crystal oscillators of the devices need to be remained stable for a long time and kept to fluctuate within a very small range, and frequency deviations of the crystal oscillators need to be calibrated in real time to avoid a timing deviation caused by accumulation of the frequency deviations.

SUMMARY

The present disclosure provides a clock calibration method, a clock calibration apparatus, an electronic device, and a readable medium.

In the first aspect, the present disclosure provides a clock calibration method, including: calculating a clock skew of a terminal device; and calibrating a clock of the terminal device according to the clock skew.

In another aspect, the present disclosure further provides a clock calibration apparatus, including a clock skew calculation module and a calibration module, and the clock skew calculation module is configured to calculate a clock skew of a terminal device; and the calibration module is configured to calibrate a clock of the terminal device according to the clock skew.

In still another aspect, the present disclosure further provides an electronic device, including: one or more processors; and a storage device having one or more programs stored thereon; and when executed by the one or more processors, the one or more programs cause the one or more processors to perform the clock calibration method described herein.

In yet another aspect, the present disclosure further provides a computer-readable medium having a computer program stored thereon; and when the computer program is executed by a processor, the clock calibration method described herein is performed.

BRIEF DESCRIPTION OF DRAWINGS

FIG. 4 is another flowchart of calculation of the clock skew according to the present disclosure;

FIG. 5 is a flowchart of determination of a moving state of a terminal device according to the present disclosure;

FIG. 6 is another flowchart of calculation of the second clock skew according to the present disclosure;

FIG. 7 is a schematic structural diagram of a clock calibration apparatus according to the present disclosure; and FIG. 8 is another schematic structural diagram of the clock calibration apparatus according to the present disclosure.

DETAIL DESCRIPTION OF EMBODIMENTS

Figure 1:
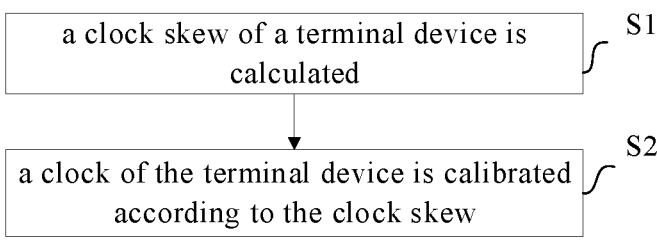
FIG. 1 is a flowchart illustrating a clock calibration method according to the present disclosure.

Exemplary implementations will be described more fully below with reference to the drawings, but the exemplary implementations may be embodied in different forms, and should not be interpreted as being limited to the implementations described herein. The implementations are provided to make the present disclosure thorough and complete, and are intended to enable those of ordinary skill in the art to fully understand the scope of the present disclosure.

The term "and/or" used herein includes any and all combinations of one or more associated listed items.

The terms used herein are merely used to describe specific implementations, and are not intended to limit the present disclosure. As used herein, "a" and "the" which indicate a singular form are intended to include a plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof.

The implementations described herein can be described with reference to plans and/or cross-sectional views with the aid of idealized schematic diagrams of the present disclosure. Accordingly, the exemplary drawings may be modified according to manufacturing techniques and/or tolerances. Therefore, the implementations are not limited to those illustrated by the drawings, but include modifications to configuration formed based on a manufacturing process. Thus, regions shown in the drawings are illustrative, and shapes of the regions shown in the drawings illustrate specific shapes of regions of elements, but are not intended to make limitations.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

According to requirements of common 4G or 5G communication systems, a clock frequency deviation needs to be less than 0.1 ppm, and an accumulated timing deviation needs to be less than 1 us. Since all crystalline materials have aging problems due to their natural physical properties, aging problems of clocks occur with the time and the environmental change. Therefore, electronic devices need to be subjected to clock calibration.

A common clock calibration method is as follows: a device is connected to a Global Navigation Satellite System (GNSS) such as the Global Positioning System (GPS) or the BeiDou Navigation Satellite System; the GPS issues a timing signal and outputs a reference pulse signal PP1S_REF; and a deviation between the pulse signal PP1S_REF and a pulse signal PP1S_Self generated by a crystal oscillator of the device is counted, an frequency error of the crystal oscillator of the device is calculated, and a frequency of the crystal oscillator is adjusted according to the frequency error to maintain accuracy of the crystal oscillator. For the devices which cannot be connected to a clock reference device (e.g., a clock server or the GNSS), clock components of higher levels need to be introduced in the devices, which greatly increases costs of the devices, accordingly increases volumes and power consumption of the devices, and restricts application environments of the devices. For example, for the devices which need to move, such as an airplane, an automobile, and a satellite, do not have stable clock sources, the common clock calibration method is not applicable to those devices.

Common clock calibration methods for the moving devices are as follows:

Method 1: manually connecting the devices to calibration clocks for clock calibration; and Method 2: randomly configuring a clock output frequency, and performing wide-range frequency sweeping to try to find a correct clock output frequency.

However, the method of manually connecting to the calibration clocks is low in precision and high in labor cost, and the method of randomly configuring the clock frequency and performing the frequency sweeping is low in calibration efficiency.

The present disclosure provides a clock calibration method. As shown in FIG. 1, the clock calibration method may include the following operations S1 and S2.

In operation S1, a clock skew of a terminal device is calculated.

In this operation, a clock calibration apparatus may determine the clock skew of the terminal device according to a change of a sequence of air interface signals between the terminal device and a network access device connected thereto, or may determine a Doppler shift and determine the clock skew of the terminal device according to the Doppler shift.

It should be noted that the terminal device in the present disclosure may be a wireless device in a moving state such as a wireless communication device on a moving car, train, airplane, or satellite, and the clock calibration apparatus may be a functional module of the terminal device.

In operation S2, a clock of the terminal device is calibrated according to the clock skew.

In some implementations, calibrating the clock of the terminal device according to the clock skew includes: calculating a voltage control parameter $P_{clk}$ according to the clock skew, and driving the clock of the terminal device according to the voltage control parameter Pak.

The clock of the terminal device may be a clock component such as an Oven Controlled Crystal Oscillator (OCXO) or a Temperature Compensated Crystal Oscillator (TCXO). In this operation, the clock calibration apparatus may store the voltage control parameter $P_{clk}$ in a flash memory (FLASH), so that the clock calibration apparatus may continuously use the voltage control parameter Pak and be kept stable after being powered on or off again. After being powered on, the clock calibration apparatus calls the voltage control parameter $P_{clk}$ from the FLASH, and drives the clock component such as the OCXO or the TCXO with the voltage control parameter Pak, thereby realizing self-calibration of the clock of the terminal device.

The clock calibration method provided by the present disclosure includes: calculating the clock skew of the terminal device, and calibrating the clock of the terminal device according to the clock skew. For the terminal device in the moving state, the present disclosure provides a scheme to realize automatic clock calibration without connecting to a clock reference device, so that clock calibration precision and clock calibration efficiency can be improved, and labor cost can be reduced.

Figure 2:
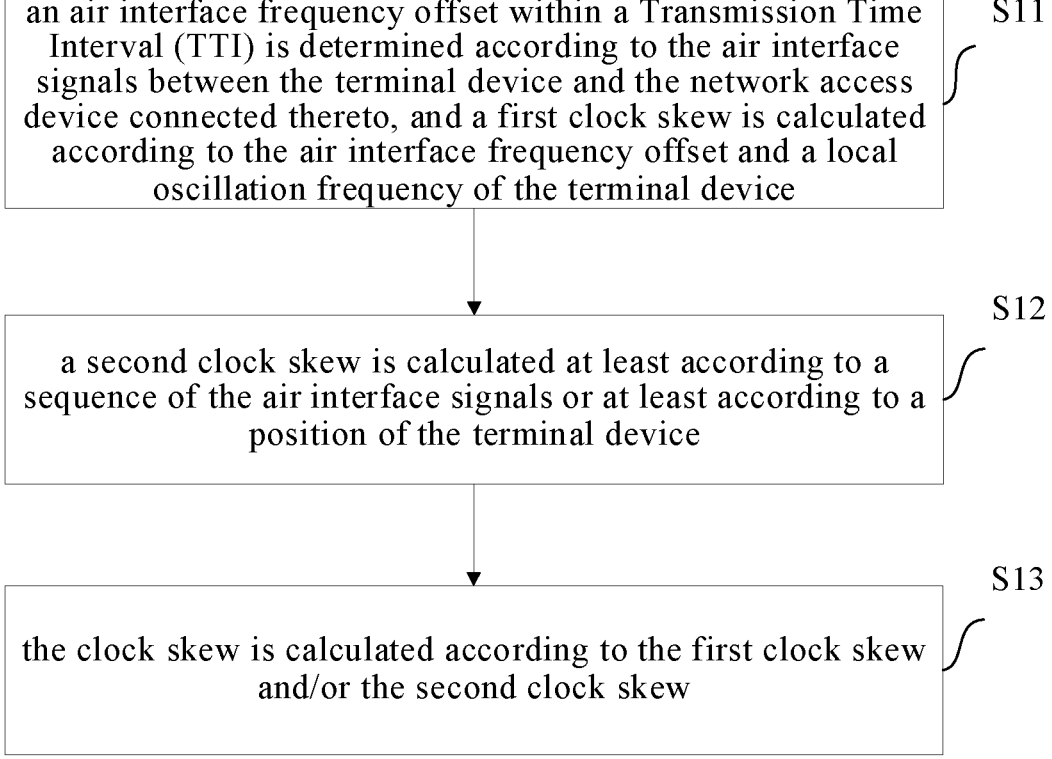
FIG. 2 is a flowchart of calculation of a clock skew according to the present disclosure.

In some implementations, as shown in FIG. 2, calculating the clock skew of the terminal device (i.e., the operation S1) includes the following operations S11 to S13.

In operation S11, an air interface frequency offset within a Transmission Time Interval (TTI) is determined according to the air interface signals between the terminal device and the network access device connected thereto, and a first clock skew is calculated according to the air interface frequency offset and a local oscillation frequency of the terminal device.

In this operation, the clock calibration apparatus may obtain the air interface frequency offset within each TTI through frequency offset estimation according to the air interface signals such as a Primary Synchronization Signal (PSS), a Secondary Synchronization Signal (SSS), a Reference Signal (RS), and/or a Clock Pulse signal (CP) between the terminal device and the network access device (e.g., a base station) connected thereto, and obtain a smoothed air interface frequency offset F signal by means of, but not limited to, averaging, coefficient factor multiplication and addition, or a distribution curve. The first clock skew $F_{clk1}$ is calculated by the following formula: $F_{clk1}=F_{signal}/F_c$ according to the air interface frequency offset $F_{signal}$ and the local oscillation frequency $F_c$ (which is a constant) of the terminal device.

In operation S12, a second clock skew is calculated at least according to a sequence of the air interface signals or at least according to a position of the terminal device.

The two specific schemes to calculate the second clock skew will be described in detail below with reference to the drawings.

In operation S13, the clock skew is calculated according to the first clock skew and/or the second clock skew.

In this operation, the clock calibration apparatus may calculate the clock skew $F_{clk}$ by subjecting the first clock skew $F_{clk1}$ and the second clock skew $F_{clk2}$ to, but not limited to, averaging, coefficient factor multiplication and addition method, or a distribution curve, that is, calculating by the formula: $F_{clk}=f(F_{clk1}, F_{clk2})$.

A process of calculating the second clock skew at least according to the sequence of the air interface signals is described in detail below with reference to FIG. 3.

Figure 3:
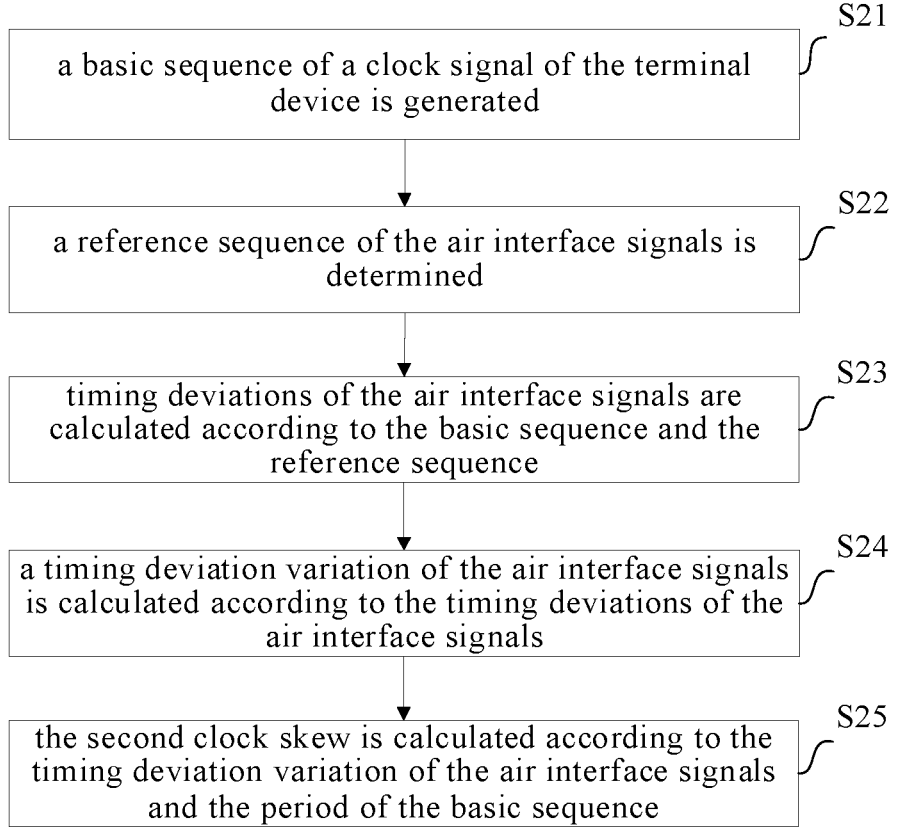
FIG. 3 is a flowchart of calculation of a second clock skew according to the present disclosure.

In some implementations, as shown in FIG. 3, calculating the second clock skew at least according to the sequence of the air interface signals (i.e., the operation S12) includes the following operations S21 to S25.

In operation S21, a basic sequence of a clock signal of the terminal device is generated.

In this operation, the clock calibration apparatus generates a periodic basic sequence $T_{loc}N$ using the clock of the terminal device, where N=0, 1, 2 . . . n, a period of the basic sequence is $T_{period}$, and typically $T_{period}=10$ ms.

In operation S22, a reference sequence of the air interface signals is determined.

In this operation, the clock calibration apparatus may determine the reference sequence $T_{mes}N$ of the air interface signals at a base station side according to sequences of uplink and downlink air interface signals such as uplink and downlink PSSs, uplink and downlink SSSs, uplink and downlink RSs, uplink and downlink CPs, uplink and downlink Access Maximum Timing Advance Signals (TAs), and/or uplink and downlink Maintain Maximum Timing Advance Signals (tas).

In operation S23, timing deviations of the air interface signals are calculated according to the basic sequence and the reference sequence.

In this operation, the clock calibration apparatus may respectively calculate the timing deviation $\Delta T_{change}N$ of the air interface signals at each moment according to the basic sequence $T_{loc}N$ and the reference sequence $T_{mes}N$, that is, calculating the timing deviation $\Delta T_{change}N$ of the air interface signals at each moment according to the following formula:

$$\Delta T_{change}N = T_{mes}N - T_{loc}N.$$

In operation S24, a timing deviation variation of the air interface signals is calculated according to the timing deviations of the air interface signals.

In this operation, the clock calibration apparatus may first calculate the timing deviation variation $T_{delta}N$ of the air interface signals at each moment according to the timing deviations of the air interface signals of adjacent moments. A calculation formula of the timing deviation variation of the air interface signals at each moment is as follows: $T_{delta}N = \Delta T_{change}(N+1) - \Delta T_{change}N$, for example, $T_{delta}0 = \Delta T_{change}1 - \Delta T_{change}0$, $T_{delta}1 = \Delta T_{change}2 - \Delta T_{change}1$, and so on. Then, the terminal device may obtain a smoothed timing deviation variation $T_{delta}$ of the air interface signals by means of, but not limited to, averaging, coefficient factor multiplication and addition, or a distribution curve.

In operation S25, the second clock skew is calculated according to the timing deviation variation of the air interface signals and the period of the basic sequence.

In this operation, the clock calibration apparatus may obtain the second clock skew $F_{clk2}$ according to a ratio of the time deviation variation $T_{delta}$ of the air interface signals to the period $T_{period}$ of the basic sequence, that is, calculating the second clock skew $F_{clk2}$ according to the following formula: $F_{clk2} = T_{delta}/T_{period}$.

In some implementations, determining the reference sequence of the air interface signals (i.e., the operation S22) includes: respectively determining an uplink air interface signal sequence $T_{tx}N$ and a downlink air interface signal sequence $T rx N$, and determining the reference sequence $T_{mes}N$ of the air interface signals according to the uplink air interface signal sequence $T_{tx}N$ and the downlink air interface signal sequence $T_{rx}N$.

In this operation, the clock calibration apparatus maintains the periodic uplink air interface signal sequence (i.e., a transmission sequence) $T_{tx}N$: $T_{tx}0, T_{tx}1 \ldots T_{tx}n$ according to the uplink air interface signals such as, but not limited to, the uplink TAs and the uplink tas, and maintains the periodic downlink air interface signal sequence (i.e., a reception sequence) $T_{rx}N$: $T_{rx}0, T_{rx}1 \ldots T_{rx}n$ using the downlink air interface signals such as, but not limited to, the downlink PSSs, the downlink SSSs, the downlink RSs, and/or the downlink CPs. The reference sequence $T_{mes}N$ of the air interface signals is determined according to the following formula: $T_{mes}N = (T_{tx}N - T_{rx}N)/2$, thereby obtaining the reference sequence of the air interface signals at the base station side: $T_{mes}0, T_{mes}1 \ldots T_{mes}n$.

In some implementations, as shown in FIG. 4, before the operation of calculating the clock skew according to the first clock skew and/or the second clock skew (i.e., the operation S13), the clock calibration method further includes: operation S12', determining a moving state of the terminal device.

The moving states may include: a stationary state, a low-speed moving state, and a high-speed moving state. In this operation, the clock calibration apparatus may determine a current moving state of the terminal device according to a moving speed of the terminal device and preset thresholds. A process of determining the moving state of the terminal device will be described in detail below with reference to FIG. 5.

Correspondingly, as shown in FIG. 4, calculating the clock skew according to the first clock skew and/or the second clock skew (i.e., the operation S13) includes: operation S13', calculating the clock skew in the moving state according to the first clock skew and/or the second clock skew, with the clock skew varying in different moving states.

In this operation, a specific way of calculating the clock skew may be chosen according to the moving state of the terminal device determined in the operation S12', and the ways of calculating the clock skew are different in the different moving states. For example, if the terminal device is in the stationary state, the clock skew $F_{clk}$ may be the first clock skew $F_{clk1}$ satisfying $F_{clk1} = F_{signal}/F_c$; and if the terminal device is in the high-speed moving state, the clock skew $F_{clk}$ may be obtained by accumulation of the first clock skew $F_{clk1}$ and the second clock skew $F_{clk2}$ according to a certain coefficient factor. Apparently, those of ordinary skill in the art are aware that the above calculation of the clock skew is merely for illustration, and any scheme to calculate the clock skew in the current moving state of the terminal device according to the first clock skew and/or the second clock skew falls within the scope of the present disclosure.

In some implementations, as shown in FIG. 5, determining the moving state of the terminal device (i.e., the operation S12') includes the following operations S121' to S123'.

In operation S121', a transmission speed of the uplink air interface signals is calculated according to the period of the basic sequence and the uplink air interface signal sequence.

In this operation, the clock calibration apparatus calculates a timing deviation variation $\Delta T'_{tx}$ of the uplink air interface signals according to the uplink air interface signal sequence $T_{tx}N$, and then calculates the transmission speed $V_{tx}$ of the uplink air interface signals according to the timing deviation variation $\Delta T'_{tx}$ of the uplink air interface signals and the period $T_{period}$ of the basic sequence. The terminal device first calculates the timing deviation $\Delta T_{tx}N = T_{tx}(N+1) - T_{tx}N$ of the uplink air interface signals at each moment according to the uplink air interface signal sequence $T_{tx}N$, and the timing deviation variation of the uplink air interface signals is calculated by $\Delta T'_{tx}N = \Delta T_{tx}(N+1) - \Delta T_{tx}N$, for example, $\Delta T'_{tx}0 = \Delta T_{tx}1 - \Delta T_{tx}0$, $\Delta T'_{tx}1 = \Delta T_{tx}2 - \Delta T_{tx}1$, and so on. Then, the clock calibration apparatus may obtain the smoothed timing deviation variation $\Delta T'_{tx}$ of the uplink air interface signals by means of, but not limited to, averaging, coefficient factor multiplication and addition, and a distribution curve. The terminal device calculates the transmission speed $V tx$ of the uplink air interface signals by the following formula: $V_{tx} = \Delta T'_{tx}/T_{period}$.

In operation S122', a transmission speed of the downlink air interface signals is calculated according to the period of the basic sequence and the downlink air interface signal sequence.

In this operation, the clock calibration apparatus calculates a timing deviation variation $\Delta T'_{rx}$ of the downlink air interface signals according to the downlink air interface signal sequence $T_{rx}N$, and then calculates the transmission speed $V_{rx}$ of the downlink air interface signals according to the timing deviation variation $\Delta T'_{rx}$ of the downlink air interface signals and the period $T_{period}$ of the basic sequence. The clock calibration apparatus first calculates the timing deviation $\Delta T_{rx}N = T_{rx}(N+1) - T_{rx}N$ of the downlink air interface signals at each moment according to the downlink air interface signal sequence $T_{rx}N$, and the timing deviation variation of the downlink air interface signals is calculated by $\Delta T'_{rx}N = \Delta T_{rx}(N+1) - \Delta T_{rx}N$, for example, $\Delta T'_{rx}0 = \Delta T_{rx}1 - \Delta T_{rx}0$, $\Delta T'_{rx}1 = \Delta T_{rx}2 - \Delta T_{rx}1$, and so on. Then, the clock calibration apparatus may obtain the smoothed timing deviation variation $\Delta T'_{rx}$ of the downlink air interface signals by means of, but not limited to, averaging, coefficient factor multiplication and addition, and a distribution curve. The clock calibration apparatus calculates the transmission speed $V_{rx}$ of the downlink air interface signals by the following formula: $V_{rx} = \Delta T'_{rx} / T_{period}$.

In operation S123', the moving state of the terminal device is determined according to the transmission speed of the uplink air interface signals, the transmission speed of the downlink air interface signals, and the preset thresholds.

The preset thresholds include a first threshold and a second threshold, where the first threshold<the second threshold. If $V_{tx}$<the first threshold and $V_{rx}$<the first threshold, the terminal device is in the stationary state; if the first threshold≤$V_{tx}$≤the second threshold, and the first threshold≤$V_{tx}$≤the second threshold, the terminal device is in the low-speed moving state; and if $V_{tx}$>the second threshold and $V_{rx}$>the second threshold, the terminal device is in the high-speed moving state.

At present, for a fixed wireless device, periodic signals such as primary and secondary synchronization Physical Broadcast Channels (PBCHs) issued by the base station may be recovered through downlink synchronization air interface signals, a 10 ms frame header is recovered using the periodic signals, and a clock frequency of the device is calibrated using the recovered air interface 10 ms frame header. However, when the wireless device is moving, a distance between the moving wireless device and a base station device is continuously changed, with the result that the air interface signals cannot be trusted and cannot be directly used for the clock calibration of the device. The present disclosure sets forth a scheme to perform the clock calibration based on elimination of the frequency offset of the air interface signals; and according to the scheme, the air interface frequency offset is determined according to the air interface signals between the terminal device and the network access device connected thereto, and the first clock skew is calculated according to the air interface frequency offset and the local oscillation frequency of the terminal device; the reference sequence at the base station side is determined, the timing deviation variation of the air interface signals is determined, and the second clock skew is calculated based on the timing deviation variation of the air interface signals and the period of the basic sequence; the moving state, i.e., the stationary state, the low-speed moving state, or the high-speed moving state, of the terminal device is determined, the clock skew in the current moving state is calculated according to the first clock skew and/or the second clock skew, and clock calibration and compensation is performed based on the clock skew.

A process of calculating the second clock skew at least according to the position of the terminal device is described in detail below with reference to FIG. 6. This scheme to calculate the second clock skew is applicable to clock calibration of a terminal device which needs to move at a high speed, such as a 4G/5G terminal on an airplane, a 4G/5G terminal on a high-speed rail train, or a satellite terminal. In those scenarios, it is hard to mount independent external GNSS receivers and antennas to those terminals based on the 4G/5G system, but the terminals can acquire position information of the airplane or the train through a position data bus interface of the airplane or the high-speed rail train.

In some implementations, as shown in FIG. 6, calculating the second clock skew at least according to the position of the terminal device includes the following operations S31 to S33.

In operation S31, a position of the network access device is determined.

In this operation, the clock calibration apparatus may acquire position information $P_{ref}$ of the base station connected to the terminal device through an air interface, or acquire the position information $P_{ref}$ of the base station connected to the terminal device locally stored in the terminal device.

In operation S32, an angle between the terminal device and the network access device is determined according to the position of the network access device, and the position, a moving direction, and the moving speed of the terminal device.

The clock calibration apparatus may directly acquire a moving speed V of a device (e.g., the airplane or the train) to which the terminal device belongs through a bus interface, or receive position information $P_{loc}$ (e.g., GPS information) of the terminal device (which is also the device to which the terminal device belongs, such as the airplane or the train) through the bus interface, determine a distance variation $D_{change}$ according to the position information PR, of the terminal device, and calculate the moving speed V of the terminal device according to $V = D_{change}/T$, where $D_{change}$ is the distance variation, T is a position update period of the terminal device, and typically T=1 s. The clock calibration apparatus may directly acquire the moving direction $A_{exp}$ of the device (such as the airplane or the train) to which the terminal device belongs through the bus interface, or calculate the moving direction $A_{exp}$ with the GPS through three-dimensional operation.

In this operation, the clock calibration apparatus calculates the angle $\theta$ between the terminal device and the base station connected thereto according to the position information $P_{ref}$ of the base station, and the position information $P_{loc}$, the moving direction $A_{exp}$, and the moving speed V of the terminal device.

In operation S33, the second clock skew is calculated according to the moving speed and the local oscillation frequency of the terminal device, the speed of light, and the angle between the terminal device and the network access device.

In this operation, the clock calibration apparatus calculates the second clock skew (i.e., the Doppler shift $F_{Doppler}$) of the terminal device at each moment according to a Doppler shift calculation formula,

9

$$\text{i.e., } F_{clk2} = F_{Doppler} = \frac{V}{\lambda \cos \theta} = \frac{VF_c}{C \cos \theta},$$

where $\lambda$ is a wavelength and $\lambda = C/F_c$, C is the speed of light, $F_c$ is the local oscillation frequency of the terminal device, V is the moving speed of the terminal device, and $\theta$ is the angle between the terminal device and the network access device. The clock calibration apparatus obtains the second clock skew $F_{clk2}$ by smoothing the second clock skew at each moment by means of, but not limited to, averaging, coefficient factor multiplication and addition, or a distribution curve.

It should be noted that, before the operation of calculating the clock skew according to the first clock skew and/or the second clock skew, the clock calibration method further includes: determining the moving state of the terminal device. In some implementations, determining the moving state of the terminal device includes: determining the moving state of the terminal device according to the moving speed of the terminal device and the preset thresholds. The moving states may include: the stationary state, the low-speed moving state, and the high-speed moving state. The preset thresholds include the first threshold and the second threshold, where the first threshold<the second threshold. If the moving speed V of the terminal device satisfies V<the first threshold, the terminal device is in the stationary state; if the moving speed V of the terminal device satisfies the first threshold<V<the second threshold, the terminal device is in the low-speed moving state; and if the moving speed V of the terminal device satisfies V>the second threshold, the terminal device is in the high-speed moving state.

Correspondingly, calculating the clock skew according to the first clock skew and/or the second clock skew includes: calculating the clock skew in the moving state according to the first clock skew and/or the second clock skew, with the clock skew varying in the different moving states. In this operation, different ways of calculating the clock skew may be chosen according to the different moving states of the terminal device. For example, if the terminal device is in the stationary state, the clock skew $F_{clk}$ may be the first clock skew $F_{clk1}$ satisfying $F_{clk1} = F_{signal}/F_c$; and if the terminal device is in the high-speed moving state, the clock skew $F_{clk}$ may be a difference between the air interface frequency offset $F_{signal}$ and the second clock skew (i.e., the Doppler shift), that is, $F_{clk} = F_{signal} - F_{clk2}$. Apparently, those of ordinary skill in the art are aware that the above calculation of the clock skew is merely for illustration, and any scheme to calculate the clock skew in the current moving state of the terminal device according to the first clock skew and/or the second clock skew falls within the scope of the present disclosure.

According to the present disclosure, the moving state of the terminal device is determined according to the moving speed of the terminal device, the Doppler shift is determined according to the positions of the base station and the terminal device, the moving direction and the moving speed of the terminal device, and the angle between the terminal device and the base station, and is distinguished from a clock frequency offset, the clock skew in the current moving state is calculated according to the Doppler shift and/or the air interface frequency offset, and the clock calibration and compensation is performed based on the clock skew.

The method provided by the present disclosure can realize the self-calibration of the clock when the terminal device is in an offline state (that is, when the terminal device cannot be connected to the clock reference device), so that a requirement of the terminal device on the accuracy of the clock component and an aging index requirement of the clock component can be reduced, a cost of the terminal device can be reduced, the terminal device can be ensured to work offline for a long time, a life cycle of the terminal device can be prolonged, clock stability of the terminal device can be improved, a manual maintenance cost can be accordingly reduced, and the clock calibration precision and the clock calibration efficiency can be improved.

The present disclosure further provides a clock calibration apparatus based on the same technical thoughts. As shown in FIG. 7, the clock calibration apparatus includes a clock skew calculation module 101 and a calibration module 102, and the clock skew calculation module 101 is configured to calculate a clock skew of a terminal device.

The calibration module 102 is configured to calibrate a clock of the terminal device according to the clock skew.

In some implementations, the clock skew calculation module 101 is configured to determine an air interface frequency offset within a TTI according to air interface signals between the terminal device and a network access device connected thereto, and calculate a first clock skew according to the air interface frequency offset and a local oscillation frequency of the terminal device, calculate a second clock skew at least according to a sequence of the air interface signals or at least according to a position of the terminal device, and calculate the clock skew according to the first clock skew and/or the second clock skew.

In some implementations, the clock skew calculation module 101 is configured to generate a basic sequence of a clock signal of the terminal device, determine a reference sequence of the air interface signals, calculate timing deviations of the air interface signals according to the basic sequence and the reference sequence, calculate a timing deviation variation of the air interface signals according to the timing deviations of the air interface signals, and calculate the second clock skew according to the timing deviation variation of the air interface signals and a period of the basic sequence.

In some implementations, the clock skew calculation module 101 is configured to respectively determine an uplink air interface signal sequence and a downlink air interface signal sequence, and determine the reference sequence of the air interface signals according to the uplink air interface signal sequence and the downlink air interface signal sequence.

In some implementations, as shown in FIG. 8, the clock calibration apparatus further includes a state determination module 103 configured to determine a moving state of the terminal device before the clock skew calculation module 101 calculates the clock skew according to the first clock skew and/or the second clock skew.

The clock skew calculation module 101 is configured to calculate the clock skew in the moving state according to the first clock skew and/or the second clock skew, with the clock skew varying in different moving states.

In some implementations, the state determination module 103 is configured to calculate a transmission speed of uplink air interface signals according to the period of the basic sequence and the uplink air interface signal sequence, calculate a transmission speed of downlink air interface signals according to the period of the basic sequence and the downlink air interface signal sequence, and determine the moving state of the terminal device according to the transmission speed of the uplink air interface signals, the transmission speed of the downlink air interface signals, and preset thresholds.

In some implementations, the state determination module 103 is configured to calculate a timing deviation variation of the uplink air interface signal sequence, and calculate the transmission speed of the uplink air interface signals according to the timing deviation variation of the uplink air interface signal sequence and the period of the basic sequence, and/or, calculate a timing deviation variation of the downlink air interface signal sequence, and calculate the transmission speed of the downlink air interface signals according to the timing deviation variation of the downlink air interface signal sequence and the period of the basic sequence.

In some implementations, the clock skew calculation module 101 is configured to determine a position of the network access device, determine an angle between the terminal device and the network access device according to the position of the network access device, and the position, a moving direction, and a moving speed of the terminal device, and calculate the second clock skew according to the moving speed and the local oscillation frequency of the terminal device, the speed of light, and the angle between the terminal device and the network access device.

In some implementations, as shown in FIG. 8, the clock calibration apparatus further includes the state determination module 103 configured to determine the moving state of the terminal device before the clock skew calculation module 101 calculates the clock skew according to the first clock skew and/or the second clock skew.

The clock skew calculation module 101 is configured to calculate the clock skew in the moving state according to the first clock skew and/or the second clock skew, with the clock skew varying in the different moving states.

In some implementations, the calibration module 102 is configured to calculate a voltage control parameter according to the clock skew, and drive the clock of the terminal device according to the voltage control parameter.

The present disclosure further provides an electronic device, including: one or more processors and a storage device; and the storage device has stored thereon one or more programs which, when executed by the one or more processors, cause the one or more processors to perform the above clock calibration method.

The present disclosure further provides a computer-readable medium having a computer program stored thereon; and when the computer program is executed by a processor, the above clock calibration method is performed.

It should be understood by those of ordinary skill in the art that the functional modules/units in all or some of the operations and devices disclosed in the above method may be implemented as software, firmware, hardware, or suitable combinations thereof. If implemented as hardware, the division between the functional modules/units stated above is not necessarily corresponding to the division of physical components; and for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, a Random Access Memory (RAM), a Read-Only Memory (ROM), an Electrically Erasable Programmable Read-Only Memory (EEPROM), a flash memory or other storage technology, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses exemplary implementations using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular implementation can be used alone or in combination with features, characteristics and/or elements described in connection with other implementations. Therefore, it should be understood by those of ordinary skill in the art that various changes in the forms and the details can be made without departing from the scope of the present disclosure of the appended claims.

What is claimed is:

1. A clock calibration method, comprising:

calculating a clock skew of a terminal device; and calibrating a clock of the terminal device according to the clock skew, wherein calculating the clock skew of the terminal device comprises:

determining an air interface frequency offset within a transmission time interval according to air interface signals between the terminal device and the network access device connected to the terminal device, and calculating a first clock skew according to the air interface frequency offset and a local oscillation frequency of the terminal device;

calculating a second clock skew at least according to a sequence of the air interface signals or at least according to a position of the terminal device; and calculating the clock skew according to the first clock skew and/or the second clock skew.

2. The method of claim 1, before calculating the clock skew according to the first clock skew and/or the second clock skew, further comprising: determining a moving state of the terminal device; and calculating the clock skew according to the first clock skew and/or the second clock skew comprises:

calculating the clock skew in the moving state according to the first clock skew and/or the second clock skew, wherein the clock skew varies in different moving states.

3. The method of claim 2, wherein calculating the second clock skew at least according to the sequence of the air interface signals comprises:

generating a basic sequence of a clock signal of the terminal device;

determining a reference sequence of the air interface signals;

calculating timing deviations of the air interface signals according to the basic sequence and the reference sequence;

calculating a timing deviation variation of the air interface signals according to the timing deviations of the air interface signals; and calculating the second clock skew according to the timing deviation variation of the air interface signals and a period of the basic sequence.

4. The method of claim 3, wherein determining the reference sequence of the air interface signals comprises:

respectively determining an uplink air interface signal sequence and a downlink air interface signal sequence; and determining the reference sequence of the air interface signals according to the uplink air interface signal sequence and the downlink air interface signal sequence.

5. The method of claim 4, wherein determining the moving state of the terminal device comprises:

calculating a transmission speed of uplink air interface signals according to the period of the basic sequence and the uplink air interface signal sequence;

calculating a transmission speed of downlink air interface signals according to the period of the basic sequence and the downlink air interface signal sequence; and determining the moving state of the terminal device according to the transmission speed of the uplink air interface signals, the transmission speed of the downlink air interface signals, and preset thresholds.

6. The method of claim 5, wherein calculating the transmission speed of the uplink air interface signals according to the uplink air interface signal sequence and the period of the basic sequence comprises: calculating a timing deviation variation of the uplink air interface signal sequence, and calculating the transmission speed of the uplink air interface signals according to the timing deviation variation of the uplink air interface signal sequence and the period of the basic sequence; and/or calculating the transmission speed of the downlink air interface signals according to the downlink air interface signal sequence and the period of the basic sequence comprises: calculating a timing deviation variation of the downlink air interface signal sequence, and calculating the transmission speed of the downlink air interface signals according to the timing deviation variation of the downlink air interface signal sequence and the period of the basic sequence.

7. The method of claim 1, wherein calculating the second clock skew at least according to the position of the terminal device comprises:

determining a position of the network access device;

determining an angle between the terminal device and the network access device according to the position of the network access device, and the position, a moving direction, and a moving speed of the terminal device; and calculating the second clock skew according to the moving speed and the local oscillation frequency of the terminal device, the speed of light, and the angle between the terminal device and the network access device.

8. The method of claim 1, wherein calibrating the clock of the terminal device according to the clock skew comprises:

calculating a voltage control parameter according to the clock skew, and driving the clock of the terminal device according to the voltage control parameter.

9. A clock calibration apparatus, comprising a processor and a storage having instructions stored thereon which, when executed by the processor, cause the processor to perform the method of claim 1.

10. An electronic device, comprising:

one or more processors; and a storage device having one or more programs stored thereon;

when executed by the one or more processors, the one or more programs cause the one or more processors to perform the clock calibration method of claim 1.

11. A non-transitory computer-readable medium having a computer program stored thereon, wherein, when the program is executed by a processor, the clock calibration method of claim 1 is performed.

* * * * *